(12) United States Patent
Chang et al.

(10) Patent No.: US 10,346,662 B2
(45) Date of Patent: Jul. 9, 2019

(54) FINGERPRINT RECOGNITION DEVICE AND TOUCH CONTROL DEVICE WITH FINGERPRINT RECOGNITION FUNCTION

(71) Applicant: ILI TECHNOLOGY CORP., Hsinchu County (TW)

(72) Inventors: Chia-Wei Chang, Hsinchu County (TW); Tzu Wei Liu, Hsinchu County (TW)

(73) Assignee: ILI TECHNOLOGY CORP., Hsinchu County (TW)

( * ) Notice: Subject to any disclaimer, the term of this patent is extended or adjusted under 35 U.S.C. 154(b) by 126 days.

(21) Appl. No.: 15/591,437

(22) Filed: May 10, 2017

(65) Prior Publication Data

US 2017/0344789 A1 Nov. 30, 2017

(30) Foreign Application Priority Data

May 25, 2016 (CN) .......................... 2016 1 0352080

(51) Int. Cl.
*G06K 9/00* (2006.01)
*G06F 3/041* (2006.01)
(52) U.S. Cl.
CPC ......... *G06K 9/00013* (2013.01); *G06F 3/041* (2013.01)
(58) Field of Classification Search
CPC ........... G06K 9/00013; G06K 9/00006; G06K 2009/0006; G06F 3/041
USPC ......................................................... 382/124
See application file for complete search history.

(56) References Cited

U.S. PATENT DOCUMENTS

| 6,804,121 | B2* | 10/2004 | Fischbach | G06K 9/0002 |
| | | | | 257/90 |
| 7,200,288 | B2* | 4/2007 | Ogura | G06K 9/00013 |
| | | | | 382/321 |
| 7,536,039 | B2* | 5/2009 | Shinoda | G06K 9/00013 |
| | | | | 382/124 |
| 9,892,305 | B2* | 2/2018 | Lee | G06K 9/0002 |
| 2011/0317886 | A1* | 12/2011 | Matsuoka | G06F 21/32 |
| | | | | 382/124 |
| 2016/0268326 | A1* | 9/2016 | Yu | H01L 27/14618 |

FOREIGN PATENT DOCUMENTS

CN 104156714 11/2014

* cited by examiner

*Primary Examiner* — Daniel G Mariam
(74) *Attorney, Agent, or Firm* — JCIPRNET

(57) ABSTRACT

A fingerprint recognition device includes a light-transmissible substrate, a plurality of sensing elements, a set of conductive lines and a fingerprint recognition chip. The sensing elements are disposed and the set of conductive lines are an upper surface of the light-transmissible substrate. The fingerprint recognition chip is also disposed on the upper surface of the light-transmissible substrate, and is connected to the sensing elements through the set of conductive lines. The fingerprint recognition chip drives the sensing elements, receives a plurality of sensing results generated by the sensing elements, and accordingly determines a user fingerprint.

11 Claims, 10 Drawing Sheets

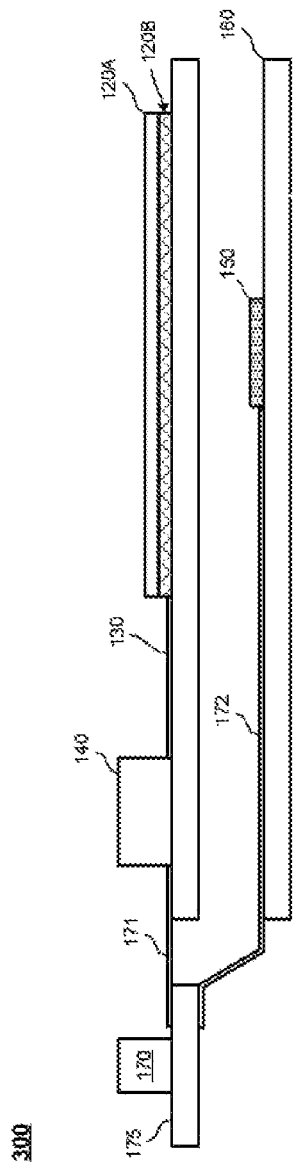
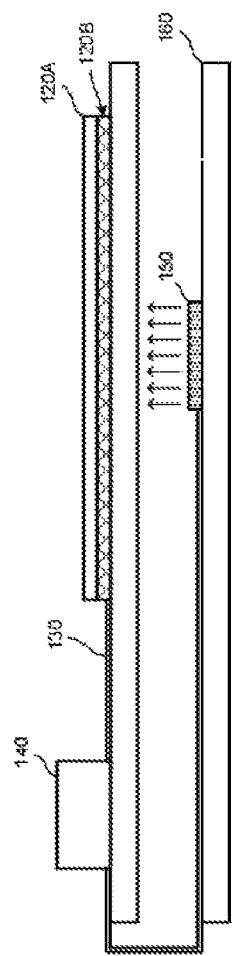
FIG. 4(A)
FIG. 4(B)

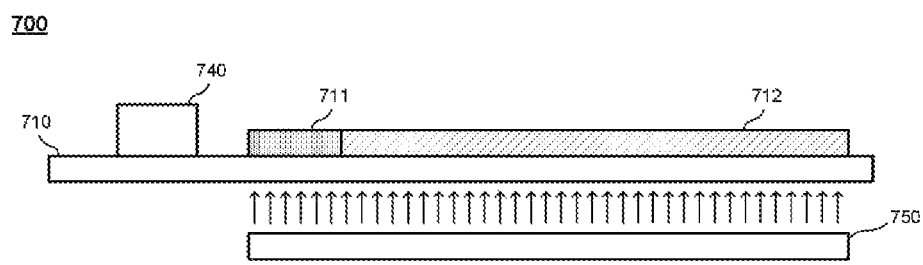
FIG. 7(C)
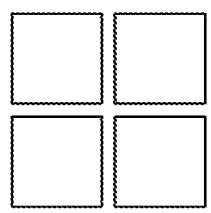 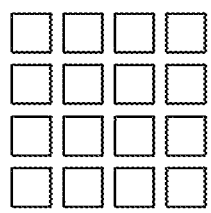 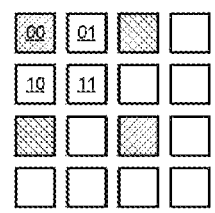
FIG. 8(A)  FIG. 8(B)  FIG. 8(C)

FINGERPRINT RECOGNITION DEVICE AND TOUCH CONTROL DEVICE WITH FINGERPRINT RECOGNITION FUNCTION

This application claims the benefit of China application Serial No. 201610352080.6, filed May 25, 2016, the subject matter of which is incorporated herein by reference.

BACKGROUND OF THE INVENTION

Field of the Invention

The invention relates in general to a fingerprint recognition device, and more particularly, to a component configuration method in a fingerprint recognition device.

Description of the Related Art

To optimize data security and eliminate the trouble of memorizing a password, many electronic products provide a fingerprint recognition function for identity verification in the recent years. A typical fingerprint recognition device usually includes a fingerprint recognition chip and a sensor formed by multiple sensing elements. The fingerprint recognition chip drives the sensing elements and receives signals generated by the sensing elements. As ridges and valleys of a fingerprint affect the sensing elements in different levels, the fingerprint recognition chip is able to determine a pattern of the fingerprint according to values of the signals generated by the sensing elements.

In the prior art, the sensor mainly incorporates with the fingerprint recognition chip in two different ways. In one way, an electrode pattern is etched on a metal layer of a surface of an integrated circuit of the fingerprint recognition chip to realize the sensing elements; that is, the fingerprint recognition chip and the sensor are directly integrated into one integrated circuit. In the other way, the sensing elements are disposed on a substrate (e.g., a light-transmissible substrate, a plastic substrate or a circuit board), and the substrate and the fingerprint recognition chip are then packaged with an integrated circuit in form of a fine-pitch ball grid array (FPGA) package. In a fingerprint recognition device in either way, the appearance of the sensor is non-light-transmissible or has low light transmissivity, and so great limitations are posed on the appearance design of an electronic product corresponding to the fingerprint recognition device.

SUMMARY OF THE INVENTION

The invention is directed to a fingerprint recognition device and a touch control device having a fingerprint recognition function. In practice, the fingerprint recognition device and touch control device of the present invention may be integrated in various electronic devices needing the fingerprint recognition function, such as mobile phones, laptop computers, and tablet computers, or be integrated in large-scale identity verification systems such as entrance control systems.

A fingerprint recognition device is provided according to an embodiment of the present invention. The fingerprint recognition device includes a light-transmissible substrate, a sensor formed by a plurality of sensing elements, a set of conductive lines and a fingerprint recognition chip. The sensing elements, the set of conductive lines and the fingerprint recognition chip are disposed on an upper surface of the light-transmissible substrate. The fingerprint recognition chip is connected to the sensing elements through the set of conductive lines, drives the sensing elements, receives a plurality of sensing results generated by the sensing elements, and accordingly determines a user fingerprint.

A touch control device having a fingerprint recognition function is provided according to an embodiment of the present invention. The touch control device includes a light-transmissible substrate, a plurality of first sensing elements, a set of conductive lines, a fingerprint recognition chip, a plurality of second sensing elements, and a touch control circuit. The first sensing elements are disposed in a first region of an upper surface of the light-transmissible substrate. The set of conductive lines are disposed on the upper surface of the light-transmissible substrate. The fingerprint recognition chip is disposed on the upper surface of the light-transmissible substrate, and is connected to the first sensing elements through the set of conductive lines. The fingerprint recognition chip drives the first sensing elements, receives a plurality of first sensing results generated by the first sensing elements, and accordingly determines a user fingerprint. The second sensing elements are disposed in a second region of the upper surface of the light-transmissible substrate. The first region and the second region form a touch control range. The touch control circuit drives the second sensing elements, receives a plurality of second sensing results generated by the second sensing elements, and determines a user touch occurring in the touch control range according to at least a part of the first sensing results and the second sensing results.

The above and other aspects of the invention will become better understood with regard to the following detailed description of the preferred but non-limiting embodiments. The following description is made with reference to the accompanying drawings.

BRIEF DESCRIPTION OF THE DRAWINGS

FIG. 4(A) and FIG. 4(B) are schematic diagrams of fingerprint recognition devices according to another two embodiment of the present invention;

FIG. 7(C) is a section view of the touch control device; and FIG. 8(A) to FIG. 8(C) show situations where a same unit area in different sensing regions including different numbers of sensing elements.

Figure 1A:
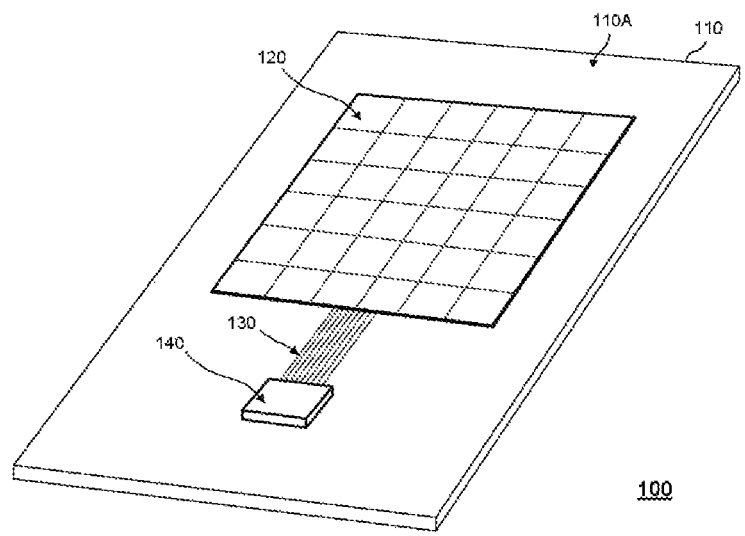
FIG. 1(A) is a schematic diagram of a configuration relationship of components of a fingerprint recognition device according to an embodiment of the present invention.

It should be noted that, the drawings of the present invention include functional block diagrams of multiple functional modules related to one another. These drawings are not detailed circuit diagrams, and connection lines therein are for indicating signal flows only. The interactions between the functional elements/or processes are not necessarily achieved through direct electrical connections. Further, functions of the individual elements are not necessarily distributed as depicted in the drawings, and separate blocks are not necessarily implemented by separate electronic elements.

DETAILED DESCRIPTION OF THE INVENTION

FIG. 1(A) shows a schematic diagram of a configuration relationship of components of a fingerprint recognition device according to an embodiment of the present invention. A fingerprint recognition device 100 includes a light-transmissible substrate 10, a sensor 120 formed by a plurality of sensing elements, a set of conductive lines 130 and a fingerprint recognition chip 140. As shown in FIG. 1(A), the sensing elements in the sensor 120, the conductive lines 130 and the fingerprint recognition chip 140 are disposed on an upper surface 110A of the light-transmissible substrate 110. For example, the material of the light-transmissible substrate 110 may be glass, plastic or a composite film, but the present invention is not limited herein.

Figure 1B:
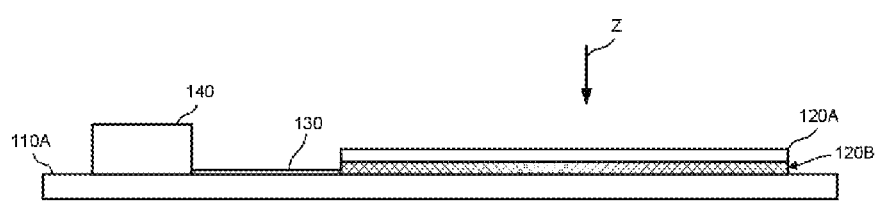
FIG. 1(B) is a side view of the fingerprint recognition device.

FIG. 1(B) shows a side view of the fingerprint recognition device 100. In this embodiment, the sensor 120 includes a cover layer 120A and an electrode layer 120B that are vertically stacked. The cover layer 120A receives a user touch and protects the electrode layer 120B, and may be made of glass or a hard coating, for example. The electrode layer 120B is a stacked structure, and includes, from top to bottom, a first metal layer M1, a first insulating layer IN1, a second metal layer M2, a second insulating layer IN2, and an adhesive layer AD. The first metal layer M1 may be manufactured to include multiple receiving electrode patterns, and the second metal layer M2 may be manufactured to include multiple driving electrode patterns, or vice versa. The receiving electrodes and driving electrodes are in pairs to form the sensing elements. Sizes, electrode shapes, numbers and arrangements of the sensing elements may be determined by a circuit designer according to the size of the sensor and the required sensing fineness. To keep the drawing simple, FIG. 1(A) shows only 6*6 sensing elements as an illustration example. In practice, the material of the adhesive layer AD may be an optical clear adhesive (OCA) having good light transmissivity and bonds the cover layer 120A and the electrode layer 120B. In practice, the material of the adhesive layer AD may have a sufficient insulation capability, and so the second insulating layer IN2 may then be omitted.

The conductive lines 130 may include multiple metal routings formed on the upper surface 110A. The fingerprint recognition chip 140 is connected to the sensor 120 through the conductive lines 130, drives the sensing elements in the sensor 120, receives the sensing results generated by the sensing elements, and accordingly recognizes a user fingerprint. In practice, the fingerprint recognition chip 140 may be an integrated circuit chip in a flip-chip package, and is connected to multiple conductive points on the light-transmissible substrate 110 through a conductive adhesive to further connect to the conductive wires 130. Compared to a conventional method of integrating the substrate including the sensing elements with the fingerprint recognition chip to an FBGA package at an assembly house, the implementation method of the present invention features in reduced packaging costs. In practice, for example, the fingerprint recognition chip 140 may include an analog-to-digital converter (ADC), a noise filtering circuit, a comparator, and a memory. It should be noted that, details of driving the sensing elements and determining a user fingerprint according to the sensing results are generally known to one person skilled in the art, and shall be omitted herein.

Figure 2:
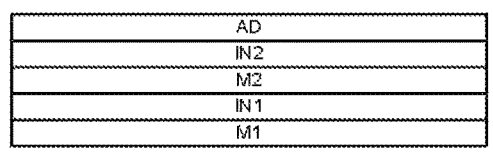
FIG. 2 is a detailed example of an electrode layer according to an embodiment of the present invention.

Referring to FIG. 1(A), FIG. 1(B) and FIG. 2, in the fingerprint recognition device 100, the light-transmissible substrate 110 and the cover layer 120A may both be designed to have good light transmissivity; the first insulating layer IN1, the second insulating layer IN2 and the adhesive layer AD in the sensor 120 may be realized by a material of good light transmissivity as well. On the other hand, in the first metal layer IN1 and the second metal layer IN2 in the sensor 120, hollow parts of the electrode patterns included may also be passed by light. Thus, if the electrode pattern in the sensor 120 is appropriately designed to include more hollow parts or electrodes are manufactured from a transparent conductive material, a substantial part of light beams traveling along the direction Z or opposite the direction Z may pass the fingerprint recognition device 100. On the other hand, even if the conductive lines 130 are formed by multiple non-light-transmissible metal lines, gaps between the routings still allow the light to pass through. Thus, from perspectives of a user, except the location of the fingerprint recognition chip 140 on the fingerprint recognition device 100, other parts are light-transmissible to certain degrees.

Compared to the prior art, the light transmissivity of the fingerprint recognition device 100 provides appearance designers of various products with greater design flexibilities. For example, when the fingerprint recognition device 100 is applied to an entrance control system, the light-transmissible substrate 110 may be the glass door. In practice, the fingerprint recognition chip 140 may be connected to other external circuits through connecting lines (not shown) on the light-transmissible substrate 110, e.g., a golden finger, to receive power supply or to provide a fingerprint determination result to a backend circuit.

Figure 3:
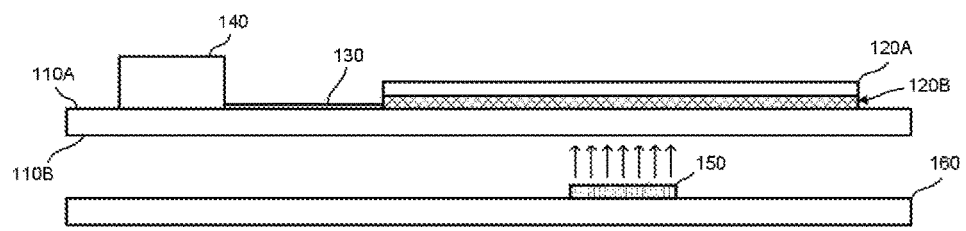
FIG. 3 is a side view of a fingerprint recognition device including a light emitting module according to another embodiment of the present invention.

FIG. 3 shows a side view of a variation of the fingerprint recognition device 100. One main difference of a fingerprint recognition device 200 from the fingerprint recognition device 100 is that, the fingerprint recognition device 200 further includes a light emitting module 150. The light emitting module 150 is disposed on a light emitting substrate 160, and may be implemented by, for example, one or multiple light emitting diodes. As shown in FIG. 3, the light emitting substrate 160 may be substantially parallel to the light-transmissible substrate 110 and face a lower surface 110B of the light-transmissible substrate 110. Light beams provided by the light emitting module 150 may pass through the light-transmissible substrate 110 and the sensing region 120 to arrive within a visual range of a user. For example, light beams emitted by the light emitting module 150 may serve as an auxiliary indication to allow a user to more easily notice the position of the sensing region 120. In practice, the light emitting module 150 may include a control circuit and a light emitting diode array (formed by multiple light emitting diodes having light beams of the same color or different colors). The control circuit cooperates with an operation mode of the fingerprint recognition device 200 to control turning on/off, brightness or color of the light emitting diodes.

FIG. 4(A) shows a schematic diagram of a variation of a fingerprint recognition device 200. A fingerprint recognition device 300 further includes a controller 170. The controller 170 is disposed on a main circuit board 175, and is coupled to the fingerprint recognition chip 140 and the light emitting module 150 through connecting lines 171 and 172. In practice, the main circuit board 175 may be a printed circuit board, and is electrically connected to the light-transmissible substrate 110 and the light emitting substrate 160 through a flexible circuit or flexible cables. In other words, each of the connecting lines 171 and 172 may include multiple sections of routings on the flexible circuit board, the main circuit board 175, the light-transmissible substrate 110 and the light emitting substrate 160. The connecting lines 171 and 172 may further include power lines that transmit power from the main circuit board 175 to the fingerprint recognition chip 140 and the light emitting module 150.

The controller 170 controls the light emitting module 150 according to a user fingerprint determined by the fingerprint recognition chip 140. For example, the controller 170 may pre-store a predetermined fingerprint pattern. When the fingerprint recognition chip 140 detects that the user fingerprint matches the predetermined fingerprint pattern, the controller 170 controls the light emitting module 150 to emit light beams of a certain color (e.g., green), and performs an operation corresponding to a successful identity verification (e.g., unlocking a mobile phone). In contrast, when the fingerprint recognition detects that the user fingerprint does not match the predetermined fingerprint pattern, the controller 170 controls the light emitting module 150 to emit light beams of another color (e.g., red), and performs an operation corresponding to an unsuccessful identity verification (e.g., displaying a text message of unlocking failed on a screen of a mobile phone). In practice, the controller 170 may be implemented as a fixed and/or programmable digital logic circuit, including a programmable logic gate array, an application-specific integrated circuit, a microcontroller, a microprocessor, a digital signal processor, and other necessary circuits.

Alternatively, as shown in FIG. 4(B), the function of the controller 170 may be distributed and performed by the fingerprint recognition chip 140 and the control circuit (not shown) of the light emitting module 150. In other words, the light emitting module 150 may be connected to the fingerprint recognition chip 140 through a connecting line 173, and be directly controlled by the fingerprint recognition chip 140 to perform the above task of emitting light beams of different colors.

Figure 5A:
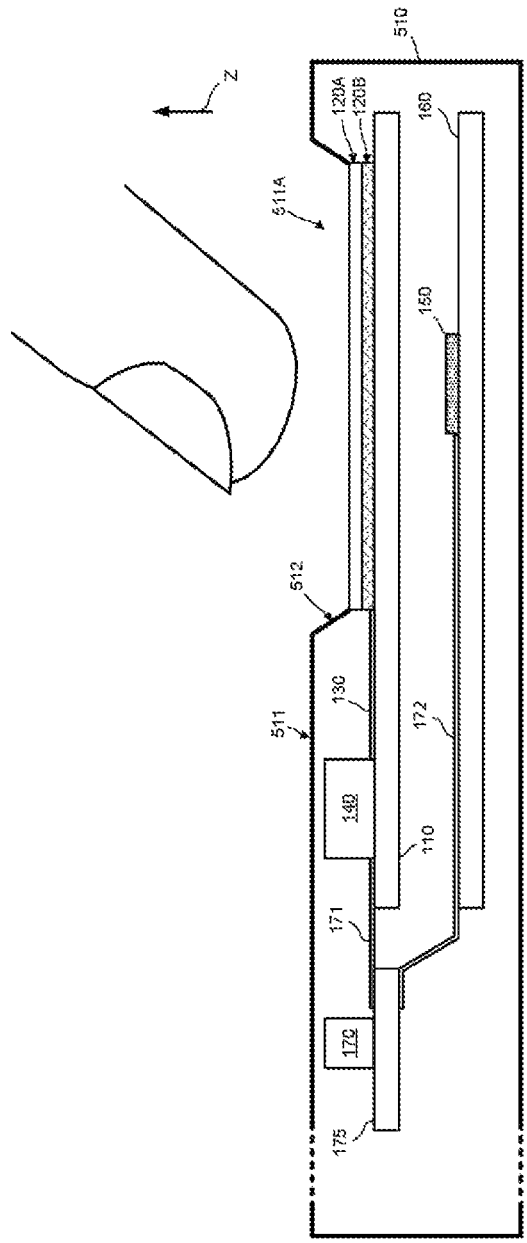
FIG. 5(A) is an example of a housing of a fingerprint recognition device according to an embodiment of the present invention.
Figure 5B:
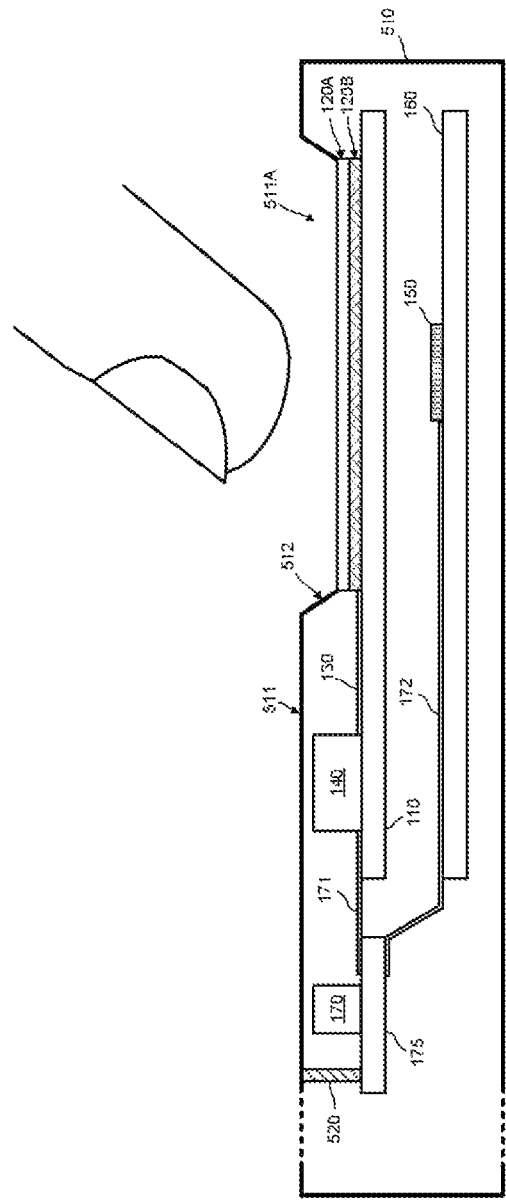
FIG. 5(B) is an example of providing an additional conductive element in the housing.

FIG. 5(A) shows an example of a housing of the fingerprint recognition device 300. In this example, the light-transmissible substrate 110, the light emitting substrate 160, the main circuit board 175 and other components thereon are accommodated in a housing 510. An upper wall 511 of the housing 510 includes an opening 511A that reveals a sensing surface of the cover layer 120A to receive a user touch. As shown in FIG. 5(B), in a reference direction Z' perpendicular to the light-transmissible substrate 110 and away from the upper surface, the height of the fingerprint recognition chip 140 is usually higher than that of the sensing region 120. By designing the thickness of the housing 510 using the height of the fingerprint recognition chip 140 as a reference, the sensing surface of the cover layer 120A in the reference direction Z' is lower than the upper wall 511 of the housing 510. To adapt to such height relationship, the housing 510 may be designed to have the opening 511A include an inclined portion 512 that inclines downwards from the upper wall 511 towards the sensing surface of the cover layer 120A. Compared to the vertical sidewall at a joint of the opening 511A and the cover layer 120A, the inclined portion 512 provides a user with better comfort when the user presses the cover layer 120A.

Referring to FIG. 5(B), in an embodiment where the housing 510 is conductive, the fingerprint recognition device 300 may further include a conductive element 520 electrically connected between an inner side of the housing 510 and the main circuit board 175. More specifically, the conductive element 520 is electrically connected to a fixed voltage end of the main circuit board 175, e.g., a ground terminal. In practice, the housing 510 may be slightly conductive as it is applied with metal spray paint. Even with such slight conductivity, the housing 510 may equate to a large capacitor, and the fixed voltage end that connects the housing 510 to the main circuit board 175 may then help eliminate background noises detected by the fingerprint recognition chip 140 to enhance the accuracy of the detection result. In practice, for example, the conductive element 520 may be a conductive foam or a metal shrapnel.

Figure 6A:
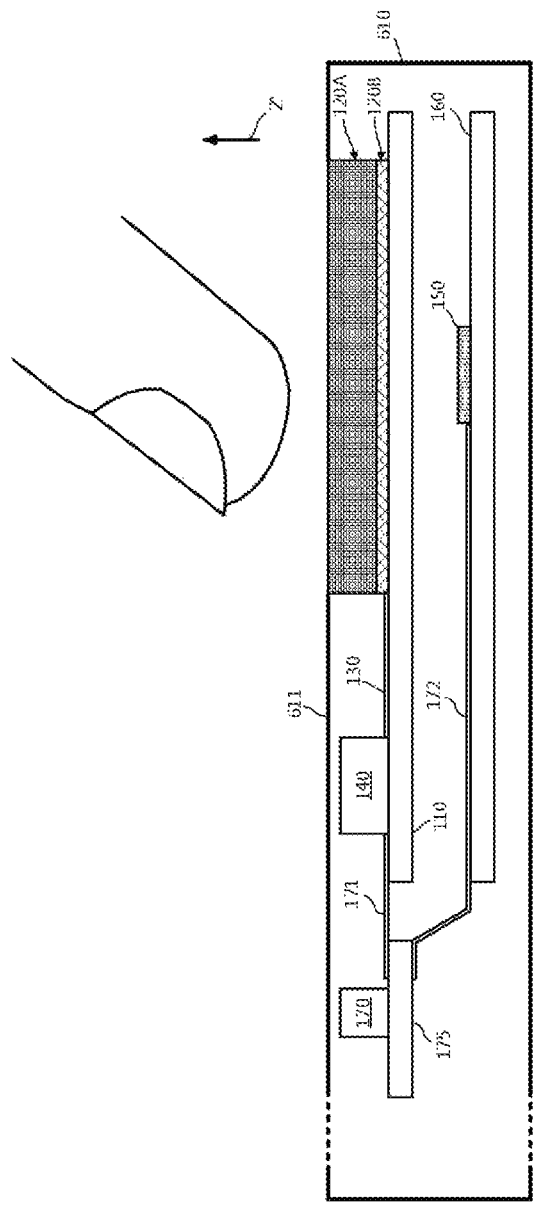
FIG. 6(A) is another example of a housing of a fingerprint recognition device according to an embodiment of the present invention.

FIG. 6(A) shows another example of a housing of the fingerprint recognition device 300. In this example, an upper wall 611 of a housing 610 similarly includes an opening that reveals the sensing surface of the cover layer 120A. One feature of this embodiment is that, in the reference direction Z' perpendicular to the light-transmissible substrate 110, the thickness of the cover layer 120A is intentionally increased to have the sensing surface have a substantially equal height as the upper wall of the housing 611, i.e., to have the cover layer 120A to be substantially closely fitted in the opening of the upper wall 611. One benefit of the above is that a leveled surface mechanism design can be achieved. In practice, the cover layer 120A with a readily controlled thickness may be realized a glass plate or a hard coating. It should be noted that, the electrode layer 120B may be thickened or the light-transmissible substrate 110 below the electrode layer 120B may be partially thickened to achieve a substantially height for the sensing surface of the cover layer 120A and the upper wall 611.

Figure 6B:
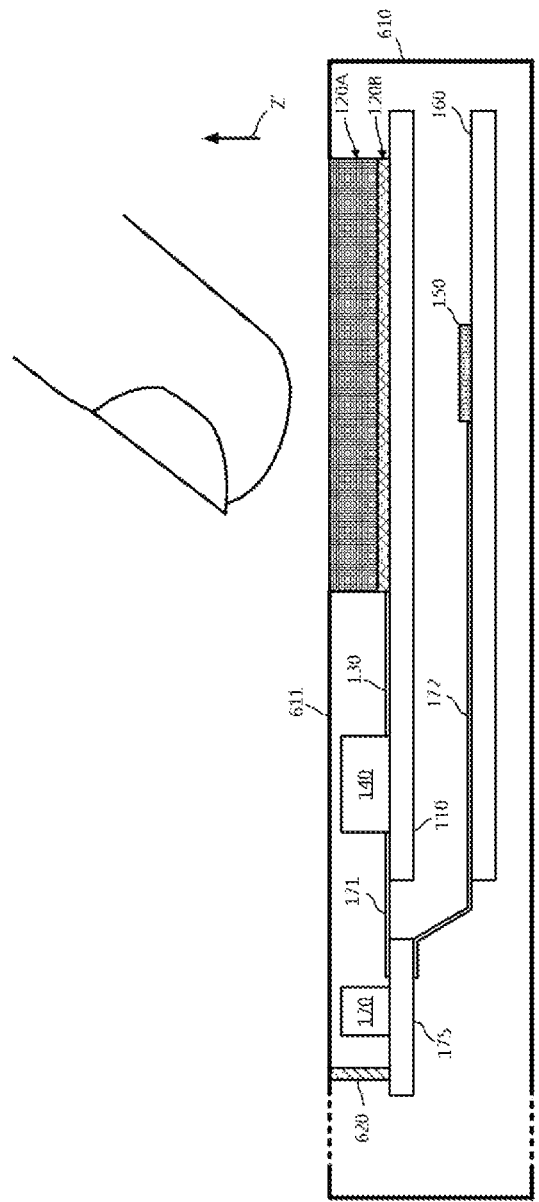
FIG. 6(B) is an example of providing an additional conductive element in the housing.

As shown in FIG. 6(B), in the embodiment where the housing 610 is conductive, a conductive component 620 may be disposed between an inner side of the housing 610 and the main circuit board 175 to enhance the accuracy the detection result of the fingerprint recognition chip 140.

Figure 7A:
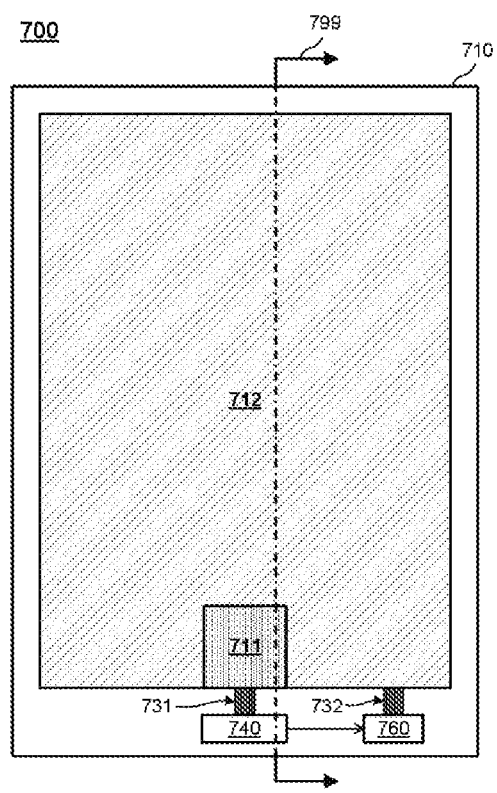
FIG. 7(A) is a schematic diagram of a configuration relationship of components in a touch control device according to an embodiment of the present invention.

FIG. 7(A) shows a schematic diagram of a configuration relationship of components of touch control device having a fingerprint recognition function according to another embodiment of the present invention. A touch control device 700 includes a light-transmissible substrate 710, a plurality of first sensing elements in a first region 711, a plurality of second sensing elements in a second region 712, a set of first conductive lines 731, a set of second conductive lines 732, a fingerprint recognition chip 740, a touch control circuit 760, and a display 750 (shown in FIG. 7(C)) disposed below the light-transmissible substrate 710.

Figure 7B:
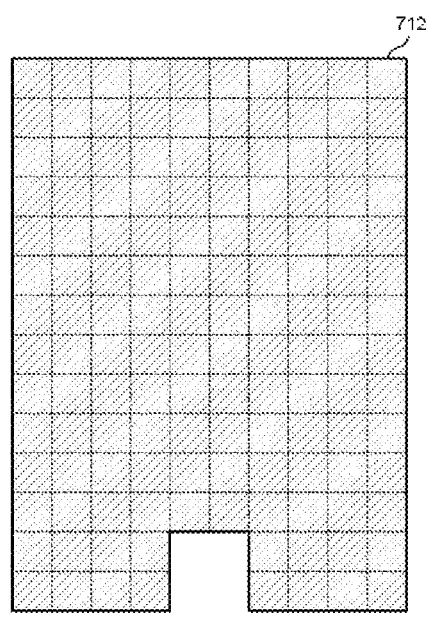
FIG. 7(B) is a schematic diagram of a contour of one second region.

In this embodiment, the first region 711 and the second region 712 form a rectangular touch control range. As shown in FIG. 7(B), to adapt to the shape and position of the first region 711, a contour of the second region 712 may be a rectangle having a recessed region. In practice, the second sensing elements may be multiple sets of electrodes made of a transparent or light-transmissible conductive material. The dotted lines in FIG. 7(B) indicate separation among the second sensing elements. In practice, the sizes, electrode shapes, numbers and arrangements of the second sensing elements may be determined by a circuit designer according to the size of the touch control device 700 and the sensing fineness and sensing resolutions required.

As shown in FIG. 7(A), the first sensing elements, the second sensing elements, the first conductive lines 731, the second conductive lines 732, the fingerprint recognition chip 740 and the touch control circuit 760 are disposed on the upper surface of the light-transmissible substrate 710. The fingerprint recognition chip 740 is connected to the first sensing elements in the first region 711 through the set of first conductive lines 731. The touch control circuit 760 is connected to the second sensing elements in the second region 712 through the set of second conductive lines 732. The fingerprint recognition chip 740 drives the first sensing elements in the first region 711, and receives a plurality of first sensing results generated by the first sensing elements. The touch control circuit 760 drives the second sensing elements in the second region 712, and receives a plurality of second sensing results generated by the second sensing elements.

FIG. 7(C) shows a section view of the touch control device 700 along a section line 799. The size of the display 750 disposed below the light-transmissible substrate 710 may be substantially equal to the size of the touch range formed by the first region 711 and the second region 712, and is located right below the touch range. Identical to the sensor 120 in FIG. 1, the first region 711 in FIG. 7(A) and FIG. 7(C) is also quite light-transmissible, and so light beams emitted by the display 750 may pass through the first region 711. Because the first region 711 and the second region 712 are both light-transmissible (although may have different light transmissivity levels), the user may completely observe an image presented by the display 750 through the first region 711 and the second region 712.

When the touch control device 700 is in a fingerprint recognition mode, the display 750 may display patterns or lines below the first region 711 to indicate the range of the first region 711 for reference of the user, who may accordingly learn where to press a fingerprint. Same as the fingerprint recognition chip 140 in FIG. 1, the fingerprint recognition chip 740 may determine a user fingerprint according to the first sensing results. In the above situation, operations of the touch control circuit 760 may be temporarily suspended.

In this embodiment, the fingerprint recognition chip 740 may collaborate with the touch control circuit 760 to cause the touch range formed by the first region 711 and the second region 712 to equate to a complete rectangular touch control region. More specifically, when the touch control device 700 need to detect a user touch of a greater range, the fingerprint recognition chip 740 drives the first sensing elements in the first region 711, and receives the first sensing results generated by the first sensing elements; the touch circuit 760 drives the second sensing elements in the second region 712, and receives the second sensing results generated by the second sensing elements. Further, the first sensing results that the fingerprint recognition chip 740 receives are provided to the touch control circuit 760. The touch control circuit 760 may then determine a user touch occurring in the rectangular touch control region according to the first sensing results and the second sensing results. In practice, the sensing results respectively generated by the fingerprint recognition chip 740 and the touch control circuit 760 may be further provided to a backend controller (not shown) for comprehensive analysis and processing. For example, the backend controller may be a central processor that universally processes general applications of the touch control device 700, a graphics processor exclusively processing display images of the display 750, or an independent touch control fingerprint processor. Comprehensively analyzing and processing these sensing results provides noticeable benefits in certain applications. For example, if the backend controller is a central processor, when one of the fingerprint recognition chip 740 and the touch control circuit 760 provides the first sensing results or the second sensing results to the central processor, the central processor may pre-activate a corresponding application or pre-load corresponding data from a memory, and then process a part of corresponding tasks before the user touch is not yet determined, hence accelerating the speed of user touch control. In another example, if the backend controller is a graphics processor, the graphics processor may control the fingerprint recognition chip 740 to sequentially send the first sensing results corresponding to sensing positions during the process of fingerprint recognition. During the process of fingerprint recognition, the graphics processor can control the display 750 to not only display patterns or lines in a still manner below the first region, but also dynamically display different patterns corresponding to the sensing positions to indicate corresponding sensing positions that have been identified. Alternatively, the backend controller in this embodiment may also be implemented a central processor that at the same time controls a graphics processor, and a similar application may be performed when the touch control circuit 760 senses a continuous dynamic gesture. Further, the backend controller may be dynamically realized by one or multiple processors multiple core processors that is/are less busy.

In general, the sensing resolution needed for fingerprint recognition is higher than the sensing resolution needed for identifying a user touch. In practice, the number of sensing elements per unit area in the first region 711 may be designed to be larger than the number of sensing elements per unit area in the second region 712. Thus, when the fingerprint recognition chip 740 and the touch control circuit 760 operate in collaboration to detect a user touch, the touch control circuit 760 may selectively utilize a part (instead of all) of the first sensing results to represent the sensing results in the first sensing region 711. Referring to FIG. 8(A) and FIG. 8(B), assume that each unit area in the first region 711 includes 4*4 first sensing elements, and each unit area in the second region 712 includes 2*2 sensing elements. Thus, the touch control circuit 760 may utilize the sensing results of the four shaded sensing elements in FIG. 8(C) to represent the sensing results of this unit area to thus reduce data processing. For example, for the first sensing elements 00, 01, 10 and 11 in FIG. 8(C), instead of adopting the sensing results of the first sensing elements 01, 10 and 11, the touch control circuit 760 multiplies the sensing amount of the first sensing element 00 by four to represent the sensing results of the four sensing elements in this region. In other examples, the first sensing element 00 may be replaced by one of the first sensing elements 01, 10 and 11, or two or even three of the first sensing elements 01, 01, 10 and 11 may be selected. Further, the touch control circuit 760 may also utilize the sensing amounts of different relative positions or numbers in regions having different unit areas to calculate the sensing results in response to different application needs.

One person skilled in the art can understand that, operation variations in the description associated with the fingerprint recognition device 100 are applicable to the touch control device 700, and shall be omitted herein.

Different from a situation of the prior art where a touch control region and a fingerprint sensing region are always independently disposed, because the first region 711 in FIG. 7(A) has good light transmissivity, the fingerprint sensing region (i.e., the first region 711) is also a part of the touch control region. One benefit of the above approach is that, the outer frame of the touch control device 700 outside the range of the display 750 can be reduced.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A fingerprint recognition device, comprising:
a light-transmissible substrate;
a sensor formed by a plurality of sensing elements, disposed on an upper surface of the light-transmissible substrate;
a set of conductive lines, disposed on the upper surface of the light-transmissible substrate;
a fingerprint recognition chip, disposed on the upper surface of the light-transmissible substrate, connected to the sensing elements through the set of conductive lines, driving the sensing elements, receiving a plurality of sensing results generated by the sensing elements, and accordingly determining a user fingerprint; and
a light emitting module, disposed on a light emitting substrate, the light emitting substrate being substantially parallel to the light-transmissible substrate and facing a lower surface of the light-transmissible substrate.

2. The fingerprint recognition device according to claim 1, wherein the fingerprint recognition chip is an integrated circuit chip in a flip-chip package, and is connected to the light-transmissible substrate through a conductive adhesive.

3. The fingerprint recognition device according to claim 1, further comprising:
a controller, coupled to the fingerprint recognition chip and the light emitting module, controlling the light emitting module according to the user fingerprint determined by the fingerprint recognition chip.

4. The fingerprint recognition device according to claim 1, wherein the sensor comprises a cover layer that receives a user touch and an electrode layer that is protected by the cover layer, the fingerprint recognition device further comprising:
a housing, accommodating the light-transmissible substrate, the sensor, the set of conductive lines and the fingerprint recognition chip, an upper wall of the housing being provided with an opening that reveals a sensing surface of the cover layer;
wherein, in a reference direction perpendicular to the light-transmissible substrate and away from the upper surface, the sensing surface of the cover layer is lower than the upper wall of the housing, and the opening comprises an inclined portion that inclines downwards from the upper wall towards the sensing surface.

5. The fingerprint recognition device according to claim 1, wherein the sensor comprises a cover layer that receives a user touch and an electrode layer that is protected by the cover layer, the fingerprint recognition device further comprising:
a housing, accommodating the light-transmissible substrate, the sensor, the set of conductive lines and the fingerprint recognition chip, an upper wall of the housing comprising an opening that reveals a sensing surface of the cover layer;
wherein, in a reference direction perpendicular to the light-transmissible substrate, a height of the sensing surface of the cover layer is substantially equal to that of the upper wall of the housing.

6. The fingerprint recognition device according to claim 1, wherein the sensor comprises a cover layer that receives a user touch and an electrode layer that is protected by the cover layer, the fingerprint recognition device further comprising:
a housing, accommodating the light-transmissible substrate, the sensor, the set of conductive lines and the fingerprint recognition chip, an upper wall of the housing comprising an opening that reveals a sensing surface of the cover layer;
a main circuit board; and
a conductive element, electrically connected between an inner side of the housing and a fixed voltage end of the main circuit board.

7. The touch control device according to claim 1, wherein the light module is configured to provide a plurality of light beams to a sensing region of the sensor via the light-transmissible substrate, and the plurality of light beams pass through the sensing region.

8. A touch control device configured to recognize fingerprint, comprising:
a light-transmissible substrate;
a plurality of first sensing elements, disposed in a first region of an upper surface of the light-transmissible substrate;
a set of conductive lines, disposed on the upper surface of the light-transmissible substrate;
a fingerprint recognition chip, disposed on the upper surface of the light-transmissible substrate, connected to the first sensing elements through the set of conductive lines, driving the first sensing elements, receiving a plurality of first sensing results generated by the first sensing elements, and accordingly determining a user fingerprint;
a plurality of second sensing elements, disposed in a second region of the upper surface of the light-transmissible substrate, the second region and the first region forming a touch control region; and
a touch control circuit, driving the second sensing elements, receiving a plurality of second sensing results generated by the second sensing elements, and determining a user touch occurring in the touch control range according to at least a part of the first sensing results and the second sensing results.

9. The touch control device according to claim 8, wherein the fingerprint recognition chip is an integrated circuit chip in a flip-chip package, and is connected to the light-transmissible substrate through a conductive adhesive.

10. The touch control device according to claim 8, further comprising:
a light emitting module, disposed on a light emitting substrate, the light emitting substrate being substantially parallel to the light-transmissible substrate and facing a lower surface of the light-transmissible substrate.

11. The touch control device according to claim 10, further comprising:
a controller, coupled to the fingerprint recognition chip and the light emitting module, controlling the light emitting module according to the user fingerprint determined by the fingerprint recognition chip.

* * * * *